United States Patent
Williams

(10) Patent No.: US 7,299,483 B2
(45) Date of Patent: Nov. 20, 2007

(54) SYSTEM AND METHOD FOR DETERMINING AND NOTIFYING USERS OF THE EXPECTED TIME-CHANNEL FOR A TELEVISION SERIES

(75) Inventor: Joseph F. Williams, Queensbury, NY (US)

(73) Assignee: Tribune Media Services, Inc., Chicago, IL (US)

( * ) Notice: Subject to any disclaimer, the term of this patent is extended or adjusted under 35 U.S.C. 154(b) by 1076 days.

(21) Appl. No.: 09/840,948

(22) Filed: Apr. 24, 2001

(65) Prior Publication Data

US 2002/0157097 A1 Oct. 24, 2002

(51) Int. Cl.
H04H 9/00 (2006.01)
H04H 7/16 (2006.01)

(52) U.S. Cl. .......................... 725/22; 725/58
(58) Field of Classification Search .................. 725/22, 725/58
See application file for complete search history.

(56) References Cited

U.S. PATENT DOCUMENTS

| 4,706,121 A | 11/1987 | Young |
| 5,532,754 A | 7/1996 | Young et al. |
| 5,699,125 A | 12/1997 | Rzeszewski et al. |
| 5,760,821 A | 6/1998 | Ellis et al. |
| 5,917,481 A | 6/1999 | Rzeszewski et al. |
| 6,052,145 A | 4/2000 | Macrae et al. |
| 6,118,492 A | 9/2000 | Milnes et al. |
| 6,549,929 B1 * | 4/2003 | Sullivan ............... 725/39 |
| 6,591,421 B1 * | 7/2003 | Sullivan ............... 725/50 |
| 2002/0054068 A1 * | 5/2002 | Ellis et al. ............ 345/716 |
| 2002/0133819 A1 * | 9/2002 | Jackson ............... 725/39 |

* cited by examiner

Primary Examiner—Scott E. Beliveau
(74) Attorney, Agent, or Firm—Holland & Knight LLP

(57) ABSTRACT

Methods, algorithms, database structures, and reports for informing consumers of changes in times and channels at which episodes of a television (TV) series are aired on television each week. Based on prior TV listings, an expected time-channel (i.e., day-of-week, time, and channel) for airing a TV series is derived. Actual time-channels for a given week are compared with the expected time-channels to determine whether a deviation from the expected time-channel has occurred. If the deviation has occurred, then the deviation is classified, stored in a database, and transferred to a report that shows a list of such deviations for various TV series.

10 Claims, 10 Drawing Sheets

Deviation Report in Text Format

On Thursday, Gilmore Girls has moved to 9:00 pm. on WPIX and Who Wants to be A Millionaire has moved to 8:00 pm on WPIX.

On Friday, The X-files will not be seen.

On Saturday, Modern Marvels will have multiple episodes starting at 10:00 am on The History Channel.

Airings Database Structure

| Channel-Week | Day of Week | Start Time | SeriesEpisode |
|---|---|---|---|
| CH1-W1 | Monday | 8:00 pm | A1 |
| CH1-W1 | Tuesday | 8:00 pm | B1 |
| CH2-W1 | Friday | 10:00 pm | C1 |
|  |  |  |  |
| CH1-W2 | Monday | 8:00 pm | A2 |
| CH1-W2 | Tuesday | 8:00 pm | B2 |
| CH1-W2 | Wednesday | 9:00 pm | B3 |
| CH2-W2 | Friday | 10:00 pm | C2 |
|  |  |  |  |
| CH1-W3 | Thursday | 9:00 pm | B4 |
| CH3-W3 | Friday | 10:00 pm | C2 |
|  |  |  |  |
| CH1-W4 | Monday | 8:00 pm | A3 |
| CH1-W4 | Tuesday | 8:00 pm | B5 |
| CH2-W4 | Friday | 10:00 pm | C3 |
| CH2-W4 | Saturday | 12:00 pm | C1 |
| CH2-W4 | Saturday | 1:00 pm | C2 |
| CH2-W4 | Saturday | 2:00 pm | C3 |
| CH3-W4 | Wednesday | 7:00 pm | D1 |

FIG. 1

Series Scheduling Expectation (SSE) Database Structure, based on weeks 1-4 of FIG. 1

| Channel | Day of Week | Start Time | Series |
|---|---|---|---|
| CH1 | Monday | 8:00 pm | A |
| CH1 | Tuesday | 8:00 pm | B |
| CH2 | Friday | 10:00 pm | C |
| CH3 | Wednesday | 7:00 pm | D |

FIG. 2

Series Scheduling Expectation (SSE) Database Structure, based on weeks 1-3 of FIG. 1

| Channel | Day of Week | Start Time | Series |
|---|---|---|---|
| CH1 | Monday | 8:00 pm | A |
| CH1 | Tuesday | 8:00 pm | B |
| CH2 | Friday | 10:00 pm | C |

FIG. 4

Deviation Database Structure for weeks 1-4, based on the SSE Database Structure of FIG. 2

| Channel-Week | Day of Week | Start Time | SeriesEpisode | Deviation Type |
|---|---|---|---|---|
| CH1-W2 | Wednesday | 9:00 pm | B3 | Series Expansion (SE) |
| CH1-W1 | Monday | 8:00 pm | A | Series Preemption (SP) |
| CH1-W3 | Thursday | 9:00 pm | B4 | Series Move (SM) |
| CH3-W3 | Friday | 10:00 pm | C2 | Series Move (SM) |
| CH2-W4 | Saturday | 12:00 pm | C1, C2, C3 | Series Marathon (MA) |

FIG. 3

Deviation Database Structure for week 4, based on the SSE Database Structure of FIG. 4

| Channel-Week | Day of Week | Start Time | SeriesEpisode | Deviation Type |
|---|---|---|---|---|
| CH2-W4 | Saturday | 12:00 pm | C1, C2, C3 | Series Marathon (MA) |
| CH3-W4 | Wednesday | 7:00 pm | D1 | Series Initiation (SI) |

FIG. 5

Examples of Conditions

| Condition | Description of Condition |
|---|---|
| 1 | Overriding Expected Time-Channel |
| 2 | 1) The TV series has aired on the reference time-channel no more than K weeks of N weeks preceding the reference week; and<br><br>2) the TV series has aired on an alternate time-channel during M weeks of the N weeks, wherein:<br>    N is an integer that exceeds 1,<br>    K is an integer that is no less than 0, and<br>    M is an integer of at least 2 and greater than .50N truncated. |

FIG. 7

Examples of Combinations of N, K, and M
for use with Condition 2 of FIG. 7.

| N | K | M |
|---|---|---|
| 2 | 0 | 1 |
| 3 | 0 | 2 |
| 4 | 0 | 3 |
| 5 | 0 | 4 |
| 6 | 0 | 5 |
| 7 | 1 | 6 |
| 8 | 1 | 7 |
| 9 | 1 | 8 |
| 10 | 1 | 9 |
| 11 | 1 | 9 |
| 12 | 1 | 10 |
| 13 | 1 | 11 |
| 14 | 1 | 12 |
| 15 | 1 | 13 |
| 16 | 1 | 14 |
| 17 | 1 | 15 |
| 18 | 1 | 16 |
| 19 | 1 | 17 |
| 20 | 2 | 18 |
| 25 | 2 | 22 |
| 30 | 3 | 27 |
| 35 | 3 | 32 |
| 40 | 4 | 36 |
| 45 | 4 | 40 |
| 50 | 5 | 45 |

FIG. 8

Deviation Report in Column Format

| Title | Expected Week Day | Expected Week Time | Current Week Day | Current Week Time | Channel |
|---|---|---|---|---|---|
| Gilmore Girls | Thursday | 9:00 pm | Thursday | 9:00 pm | WPIX |
| Who Wants to be a MIllionaire | Thursday | 10:00 pm | Thursday | 10:00 pm | WTEN |

FIG. 10

Deviation Report in Grid Format

| Channel | 8:00 pm | 8:30 pm | 9:00 pm | 9:30 pm | 10:00 pm |
|---|---|---|---|---|---|
| WPIX | | | Gilmore Girls | | |
| WTEN | Who Wants to be a MIllionaire | | | | |

FIG. 11

Deviation Report in Text Format

On Thursday, Gilmore Girls has moved to 9:00 pm. on WPIX and Who Wants to be A Millionaire has moved to 8:00 pm on WPIX.

On Friday, The X-files will not be seen.

On Saturday, Modern Marvels will have multiple episodes starting at 10:00 am on The History Channel.

FIG. 12

SYSTEM AND METHOD FOR DETERMINING AND NOTIFYING USERS OF THE EXPECTED TIME-CHANNEL FOR A TELEVISION SERIES

BACKGROUND OF THE INVENTION

1. Technical Field

The present invention relates to methods, algorithms, database structures, and reports for informing consumers of changes in times and channels at which episodes of a television series are aired on television each week.

2. Related Art

A consumer of television (TV) programming may be interested in a particular series of TV programs. For example, the consumer may have previously sampled at least one individual series episode, or the consumer may have an interest in the type of content that the series itself purports to deliver. Such previous sampling interest by the consumer creates an expectation of content for other, yet-to-be-seen episodes in the same series, and allows the consumer to ensure his or her enjoyment of TV viewing time by seeking to view such series episodes. Traditionally, consumers set aside, on a weekly basis, periods of viewing time around the consistent recurrence of a series episode at a particular time of the week. Now that significantly more channels are available to the consumer, consistent schedules for series episodes, especially on commercial broadcast networks in the U.S., have become less stable as these broadcast networks alter the standard airing times as part of an overall attempt to achieve larger audiences, especially among targeted demographic groups. As a result, a series episode that is aired in a given week may be aired at a normally expected time, at another time, or not at all.

Thus, there is a need to assist the consumer to accommodate variations in the times at which episodes of a series are aired on television each week.

SUMMARY OF THE INVENTION

The present invention provides an ETCRA method of determining and storing an expected time-channel for a television (TV) series relative to a reference week, said method comprising:

identifying in the reference week a reference time-channel on which the TV series is scheduled to be aired or has actually aired;

specifying at least one condition;

determining whether the at least one condition has been satisfied; and if the determining has determined that the at least one condition has not been satisfied, then making the expected time-channel equal to the reference time-channel, else making the expected time-channel equal to an alternate time-channel.

The present invention provides a computer code that outputs an expected time-channel for a television (TV) series relative to a reference week, said computer code comprising an ETCRA algorithm programmed to:

access: identification of the TV series, identification of a reference week, and identification of a reference time-channel on which the TV series is scheduled to be aired during the reference week or has actually aired during the reference week;

access a specification of at least one condition;

determine whether the at least one condition has been satisfied;

make the expected time-channel equal to the reference time-channel if the algorithm has determined that the at least one condition has not been satisfied; and make the expected time-channel equal to an alternate time-channel if the algorithm has determined that the at least one condition has been satisfied.

The present invention provides a Deviation Determination for Television (DDTV) method, comprising:

providing a TV series, a given week, and at least one of: (an expected time-channel for the TV series) and (at least one time-channel for the TV series for the given week); and determining whether a deviation has occurred for the TV series for the given week.

The present invention provides a computer code that performs deviation determination, said computer code comprising a Deviation Determination for Television (DDTV) algorithm programmed to:

receive as input a TV series, a given week, an expected time-channel for the TV series, and at least one time-channel for the TV series for the given week; and determine whether a deviation has occurred for the TV series for the given week.

The present invention provides a Series Scheduling Expectation (SSE) Database Structure, comprising at least one series time-channel identifier (STI), wherein each STI includes a series identifier that identifies a television (TV) series and an expected time-channel for the TV series, and wherein the expected time-channel includes identification of: a day-of-week, a program start time, and a channel.

The present invention provides a method of generating and using a Series Scheduling Expectation (SSE) Database Structure, comprising inserting a series time-channel identifier (STI) into the SSE Database Structure, wherein the STI includes a series identifier that identifies a television (TV) series and an expected time-channel for the TV series, and wherein the expected time-channel includes identification of: a day-of-week, a program start time, and a channel.

The present invention provides a Deviation Database Structure comprising at least one deviation record for a given week, wherein each deviation record relates to a program of a television (TV) series such that during the given week the program is on a time-channel that deviates from an expected time-channel for the TV series, and wherein each deviation record includes a deviation identifier, an identifier of the series, and the time-channel.

The present invention provides a method of generating a Deviation Database Structure, comprising inserting a deviation record for a given week into the Deviation Database Structure, wherein each deviation record relates to a program of a television (TV) series such that during the given week the program is on a time-channel that deviates from an expected time-channel for the TV series, and wherein each deviation record includes a deviation identifier, an identifier of the series, and the time-channel that the program is on during the given week.

The present invention provides a deviation report in column format, comprising a header row and at least one data row of deviation data for a given day of a given week, wherein each data row relates to a program of a television (TV) series, wherein the program is on a scheduled time-channel on the given day of the given week, wherein the scheduled time-channel deviates from an expected time-channel for the TV series, and wherein each data row includes: an identifier of the program and the scheduled time-channel.

The present invention provides a deviation report in grid format, comprising a header row and at least one data row of deviation data for a given day of a given week, wherein each data row identifies a program of a television (TV) series, wherein the program is on a scheduled time-channel on the given day of the given week, wherein the scheduled time-channel deviates from an expected time-channel for the TV series, and wherein each data row includes: an identifier of the program, and the time and channel at which the program is on.

The present invention provides a deviation report in text format, comprising at least one line of text organized in accordance with a template, wherein the at least one line of text line describes a deviation relating to a program of a TV series for a given day of a given week, and wherein the program is on a time-channel that deviates from an expected time-channel for the TV series.

The present invention provides a computer system, comprising a processor; at least one memory device, an input device coupled to the processor; an output device coupled to the processor, and a computer code located on the at least one memory device, wherein the processor is configured to execute the computer code, and wherein the computer code includes at least one of an ETCRA algorithm and a DDTV algorithm.

The present invention assists the consumer to accommodate variations in the times and channels at which episodes of a series are aired on television each week.

BRIEF DESCRIPTION OF THE DRAWINGS

FIG. 1 depicts an Airings Database Structure for weeks 1-4, in accordance with embodiments of the present invention.

FIG. 2 depicts a Series Scheduling Expectation (SSE) Database Structure derived from weeks 1-4 of the Airings Database Structure of FIG. 1, in accordance with embodiments of the present invention.

FIG. 3 depicts a Deviation Database Structure based on the SSE Database Structure of FIG. 2, in accordance with embodiments of the present invention.

FIG. 4 depicts a Series Scheduling Expectation (SSE) Database Structure derived from weeks 1-3 of the Airings Database Structure of FIG. 1, in accordance with embodiments of the present invention.

FIG. 5 depicts a Deviation Database Structure based on the SSE Database Structure of FIG. 4, in accordance with embodiments of the present invention.

FIG. 7 depicts conditions that may be used in conjunction with the flow chart of FIG. 6, in accordance with embodiments of the present invention.

FIG. 8 depicts examples of combinations of parameters that may be used with the second condition of FIG. 7, in accordance with embodiments of the present invention.

FIG. 10 depicts a deviation report in column format, in accordance with embodiments of the present invention.

FIG. 11 depicts a deviation report in grid format, in accordance with embodiments of the present invention.

FIG. 12 depicts a deviation report in text format, in accordance with embodiments of the present invention.

DETAILED DESCRIPTION OF THE INVENTION

Figure 6:
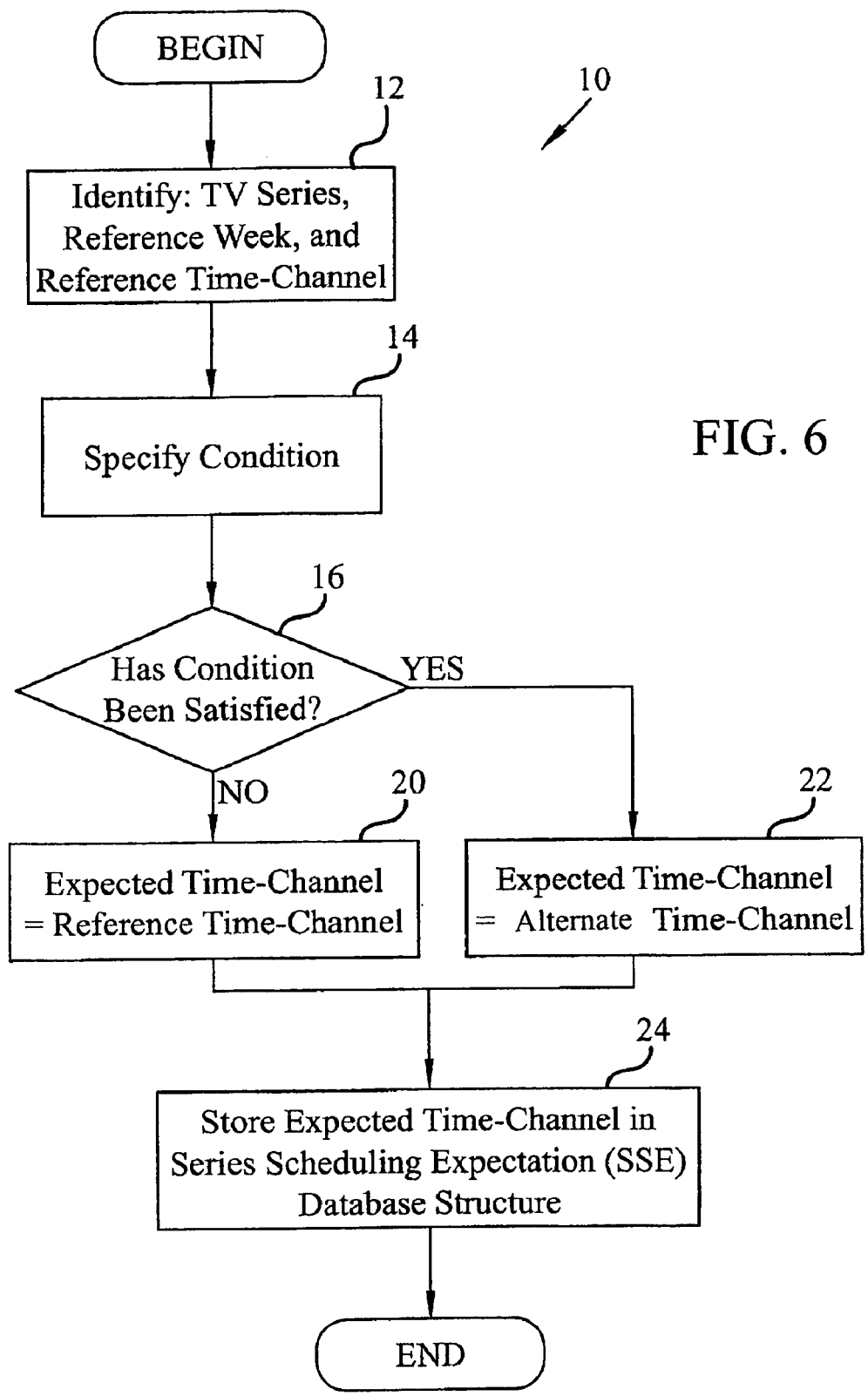
FIG. 6 is a flow chart describing a method or algorithm for determining an expected time-channel for a television (TV) series, in accordance with embodiments of the present invention.

The present invention provides methods, database structures, and reports for informing consumers of changes in times and channels at which episodes of a television (TV) series are aired on television each week. The relevant database structures of the present invention include an Airings Database Structure, a Series Scheduling Expectation (SSE) Database Structure, and a Deviation Database Structure. In the context of the present invention, a database structure comprises a structure that stores data in an organized format such as, inter alia, a relational database, a non-relational database, a spreadsheet, a table, a file, etc.

FIG. 1 illustrates an Airings Database Structure, in accordance with embodiments of the present invention. The Airings Database Structure is represented in FIG. 1 in tabular form and shows the scheduling of three TV series denoted as "A", "B", "C", and "D" over a four-week period. The Airings Database Structure has four columns respectively titled as "Channel-Week", "Day of Week", "Start Time", and "SeriesEpisode". Each row represents a scheduled airing of a TV program, wherein the TV program is an episode of a series. The Series-Episode column identifies the series and episode of the TV program. For example, B2 identifies a TV program comprising the $2^{nd}$ episode of the series B. The Channel-Week column includes a channel identifier and a week identifier. The channel identifier identifies the channel on which the episode is scheduled to be aired. The week identifier identifies the week (chronologically) during which the episode is scheduled to be aired. For example, "CH2-W4" denotes that the episode is scheduled to be aired on channel 2 during week 4. The channel identifier comprises any manner of identifying a channel such as, inter alia, an integer, call letters (e.g., WXYZ), etc. The week identifier is comprises any manner of identifying a week, such as, inter alia, an integer, a date denoting the first day of the week, etc. The Day of Week comprises any manner of identifying a day, such as, inter alia, an integer, a usual day identifier (e.g., Monday), etc. The Start Time is a time at which the TV program starts. As an example, the row comprising "CH1-W3, Thursday, 9:00 pm, B4" denotes that an episode 4 of TV series B is scheduled for airing on channel 1 during week 3 on Thursday starting at 9:00 pm.

The Airings Database Structure is a source of information about TV series scheduling, and a Series Scheduling Expectation (SSE) Database Structure may be derived from the Airings Database. A SSE Database Structure comprises expected scheduling information for each TV series. Such scheduling information is called a "time-channel" comprising a day-of-week, start time, and channel (e.g., Monday, 8:00 pm, CH1 in FIG. 1). Accordingly, a SSE Database Structure includes an expected time-channel for each series.

FIG. 2 depicts a SSE Database Structure derived from the Airings Database Structure of FIG. 1, in accordance with embodiments of the present invention. The SSE Database Structure of FIG. 2 shows an expected time-channel (alternatively called expectation time-channel) for each of series A, B, C, and D. For example, the SSE Database Structure of FIG. 2 shows that the expected time-channel for series A is [Monday, 8:00 pm, CH1], which means that an episode of series A is expected to be aired on Monday at 8:00 pm on channel 1. Each row or record of FIG. 2 comprises a "series time-channel identifier" (STI), wherein the STI includes a series identifier (e.g., A) and an associated expected time-channel (e.g., [Monday, 8:00 pm, CH1]).

Note that each series identifier (i.e., A, B, C, D) appears no more than once in the SSE Database Structure of FIG. 2. An alternative SSE Database Structure comprise STIs which are divided into groups, wherein each group includes a subset of the STIs, and wherein each series identifier appears no more than once within each group. For example, the alternative SSE Database Structure could comprise a first group and a second group, wherein the first group has series identifiers A, B, C, D, and wherein the second group has series identifiers B, C, E, F.

The next issue concerns how the SSE database Structure of FIG. 2 was derived from the from the Airings Database Structure of FIG. 1. If the SSE Database Structure of FIG. 2 was derived looking backward in time (e.g., looking backward from week 5), then FIG. 1 shows that the series A was consistently aired on [Monday, 8:00 pm, CH1] in the most recent past (i.e., week 4) as well on two earlier weeks, namely weeks 1 and 2. Additionally, while series A was not aired during week 3, series A was never aired at any time-channel that differs from Monday, 8:00 pm, CHI. Hence, the time-channel of [Monday, 8:00 pm, CH1] is the only possible choice, based on FIG. 1, for insertion in the SSE Database Structure of FIG. 2.

The series B includes three time-channels in FIG. 1, namely: a first time-channel [Tuesday, 8:00 pm, CH1] in weeks 1, 2, and 4; a second time-channel [Wednesday, 9:00 pm, CH1] in week 2; and a third time-channel [Thursday, 9:00 pm, CH1] in week 3. However, the first time-channel is a preferred choice for the expected time-channel, because the first time-channel was "relevant" for series B in the most recent past (i.e., during week 4) and was also "relevant" during weeks 1 and 2. A given time-channel relating to a series is said to be "relevant" during a given week if the series has aired or is scheduled to be aired during the given week in accordance with the given time-channel (i.e., at the time-of-day and start time, and on the channel, of the given time-channel). In contrast, the second time-channel was relevant only during week 2, and the third time-channel was relevant only during week 3. If the first time-channel has been chosen in FIG. 2 as the expected time-channel for series B, then the second and third time-channels of series B may each be viewed as a "deviation" from the expected time-channel (i.e., the first time-channel) of series B. Such deviations keyed to a week. Thus the second time-channel defined a deviation for week 2, while the third time-channel defined a deviation for week 3. Indeed, once an expected time-channel has been identified for a TV series, all other time-channels that are relevant for airing an episode of the series in any given week are viewed as "deviations" for the given week relative to the expected time-channel for the series. Whenever a deviation time-channel appears in a TV schedule or has aired, it is proper to say that a deviation has occurred. Generally, a deviation has occurred in a given week if: 1) during the given week the series has aired at a time-channel that differs from the expected time-channel, or 2) during the given week the series has not aired at all (i.e., a "Series Preemption"). The second time-channel for series B typifies a deviation for week 2 called a "Series Expansion" because both the expected time-channel and the second time-channel are relevant in week 2. The third time-channel for series B typifies a deviation for week 3 called a "Series Move," because the third time-channel, and not the expected time-channel, is relevant in week 3.

The series C includes five time-channels in FIG. 1, namely: a first time-channel [Friday, 10:00 pm, CH2] in weeks 1, 2, and 4; a second time-channel [Friday, 10:00 pm, CH3] in week 3; a third time-channel [Saturday, 12:00 pm, CH2] in week 4; a fourth time-channel [Saturday, 1:00 pm, CH2] in week 4, and a fifth time-channel [Saturday, 2:00 pm, CH2] in week 4. As with the series A and B, a good choice for the expected time-channel of series C is the first time-channel, because the first time-channel was relevant in the most recent past (i.e., in week 4) and the first time-channel was consistently relevant (i.e., in weeks 1, 2, and 4). The second time-channel for series C typifies a "Series Move" type of deviation for week 3, because the second time-channel, and not the expected time-channel, is relevant in week 3. Note that the deviation (i.e., Series Move) of the second time-channel for series C relates to a channel change. In contrast, the deviation (i.e., Series Move) of the second time-channel for series B, discussed supra, relates to a time-of-day and start time change. Generally, two time-channels are said to differ if any of time- of-day, start time, or channel differs between the two time-channels. The third, fourth, and fifth time-channels of the series C collectively represent a deviation known as a "Series Marathon" because they are scheduled in "contiguous" time slots on Saturday of week 4. Note that the word "contiguous" is intended to mean "consecutive" herein.

The series D includes one time-channel in FIG. 1, namely [Wednesday, 7:00 pm, CH3]. This time-channel of series D is an expected time-channel of series D, because this time-channel of series D is the only time-channel of series D in Table 1. In this example, there are no deviations for the series D.

The SSE Database Structure of FIG. 2 is based on weeks 1-4 of the Airings Database Structure of FIG. 1. The deviations discussed herein relative to the SSE Database Structure of FIG. 2 considered deviations for series A, B, C, and D for each of weeks 1-4. Such deviations are summarized in a Deviation Database Structure in FIG. 3. A Deviation Database Structure generally comprises at least one deviation record for a given week. Each such deviation record relates to a program of a TV series such that during the given week the program is on a time-channel that deviates from an expected time-channel for the TV series. Each deviation record includes a Deviation Type (e.g., "Series Expansion" in FIG. 3), an identifier of the series (e.g., the "B" portion of "B3" in the SeriesEpisode column of FIG. 3), and the time-channel on which the program is scheduled to be aired (see Day-of-Week, Start Time, and Channel-Week columns of FIG. 3). Each deviation record also includes an identifier of the program (e.g., "B3" in the SeriesEpisode column of FIG. 3) unless there is no relevant program such as with the deviation of Series Preemption.

Once an SSE Database Structure is specified, however, deviations may be derived for any desired week. Indeed, it is beneficial to derive series deviations for a subsequent week (i.e., a week forward in time relative to the weeks in the SSE Database Structure), in order to inform a TV consumer of such deviations when knowledge of such deviations would be useful to the consumer; i.e., at a time when the consumer needs to be informed of such deviations for those series that the consumer regularly watches on TV. To illustrate, FIG. 4 depicts a SSE Database Structure based on weeks 1-3 of the Airings Database Structure of FIG. 1. Note that series D does not appear in FIG. 4, because series D is not aired during weeks 1-3. The series D is aired for the first time during week 4, as shown in the Airings Database Structure of FIG. 1.

FIG. 5 depicts a Deviation Database Structure which summarizes series deviations for week 4 in relation to weeks 1-3 in the SSE Database Structure of FIG. 4. Note that series D appears in the Deviation Database Structure of FIG. 5 as a deviation called a "Series Initiation" (SI), because series D was aired for the first time during week 4 and thus has no expectation of being aired during week 4 based on the SSE Database Structure of FIG. 4. The appearance of series D in the Deviation Database Structure of FIG. 5 and the absence of series D in the Deviation Database Structure of FIG. 3 illustrates that deviations have relevance only with respect to a SSE Database Structure.

As discussed supra, the types of deviations that may occur comprise: Series Preemption (SP), Series Move (SM), Series Marathon (MA), Series Expansion (SE), and Series Initiation (SI). A Series Preemption (SP) occurs in a given week for a series that has previously aired, but is not aired during the given week. From FIG. 1, a preemption for series A has occurred in week 3, because the series A is not aired during week 3, but has aired in a previous week (i.e., in week 1, week 2). A Series Move (SM) occurs in a given week for a series if the expected time-channel for the series exists but is not relevant for the given week and another time-channel for the series is relevant for the given week. A Series Marathon (MA) occurs in a given week for a series if the expected time-channel for the series is relevant for the given week and the series is relevant during the given week for at least 3 contiguous time-channels that do not include the expected time-channel. A Series Expansion (SE) occurs in a given week for a series if the expected time-channel for the series is relevant for the given week and another time-channel is relevant for the given week, provided that a Series Marathon has not occurred for the given week. A Series Initiation (SI) occurs in a given week for a series that is scheduled to be aired during the given week and the series has not aired prior to the given week.

FIGS. 1-5, discussed supra, provided examples of how a SSE Database Structure with expected time-channels may be generated from an Airings Database Structure, and how series deviations may be derived for a TV series in a given week based on a given SSE Database Structure. However, FIGS. 1-5 are merely illustrative. Indeed, the present invention discloses generalized methods, algorithms, and database structures for determining expected time-channels for a given TV series, and for determining series deviations for a given week based on given expected time channels such as exists in a SSE Database Structure. Such generalized methods of the present invention are illustrated in FIGS. 6-9.

FIG. 6 is a flow chart 10 describing a method or algorithm for determining an expected time-channel for a television (TV) series, in accordance with embodiments of the present invention. The following discussion, although expressed in terms of the method of FIG. 6, applies likewise to an algorithm that implements the method of FIG. 6. The method of FIG. 6 begins with step 12, which identifies a given TV series, a reference week and a reference time-channel associated with the reference week. In some applications, the reference week is the latest week in the recent past for which TV scheduling information is known for the given TV series.

As an example using FIG. 1 with series A as the given TV series, week 4 is chosen as the reference week and the reference time-channel is [Monday, 8:00 pm, CH1].

If the reference week has plurality of time-channels, then one time-channel of the plurality of time-channels must be chosen as the reference time-channel for purposes of implementing the method of FIG. 6 for determining the expected time-channel. Of course, the method of FIG. 6 may be repeatedly applied taking in turn each time-channel in the reference week as the reference time-channel, and one of the resultant expected time-channels may be selected as the best expected time-channel.

The method of FIG. 6 makes the expected time-channel equal to the reference time-channel unless some condition is satisfied, wherein the condition reasonably dictates that the expected time-channel should be made equal to an alternative time-channel. Accordingly, step 14 of FIG. 6 comprises specifying the condition. This approach recognizes that the reference week is likely to be the most recent week for which scheduling data is available. Thus, the expected time-channel should be the same as the reference time-channel unless the condition dictates otherwise. Step 16 tests whether the condition has been satisfied. In performing the test of step 16, the method may utilize program time-channel data relating to programs of the TV series, wherein the program time-channel data is stored in an Airings Database Structure, such as the Airings Database Structure of FIG. 1 that was used for determining the expected time-channels in the SSE Database Structures of FIGS. 2 and 4. If the condition has not been satisfied, then in step 20 the method makes the expected time-channel equal to the reference time-channel. If the condition has been satisfied, then in step 22 the method makes the expected time-channel equal to the alternate time-channel. Step 24 stores the expected time-channel in a SSE Database Structure.

Examples of conditions are shown in FIG. 7, in accordance with embodiments of the present invention. A first example condition in FIG. 7 is an overriding expected time-channel, such as may be based on human expertise derived from exposure to various external information inputs such as advertising, public relations information and programming contacts to provide an alternate time-channel that is a better choice of expectation time-channel than is the reference time channel.

A second example condition in FIG. 7 is based on looking N weeks ($N \geq 2$) backward in time from the reference week and testing to determines if another time-channel (called an alternate time-channel) has aired during the N weeks. An example of another time-channel for series B in FIG. 1 is [Thursday, 9:00 pm, CH1] which aired in week 3. Then the condition is based on balancing the frequency of airing of the reference time-channel against the frequency of airing the alternate time-channel, during the 10 weeks. It stands to reason that the expected time-channel should be the reference time-channel, rather than the alternate time-channel, unless the alternate time-channel has aired frequently and the alternate time-channel has aired infrequently during the N weeks. Mathematically, the condition is structured as follows:

1) the TV series has aired on the reference time-channel no more than K weeks of N weeks preceding the reference week; and 2) the TV series has aired on an alternate time-channel during M weeks of the N weeks, wherein:

N is an integer of at least 2,

K is an integer that is no less than 0, and

M is an integer of at least 2 and greater than 0.50N truncated.

Note that a number X "truncated" (e.g., 0.50N truncated) means that if X has an integer portion and a decimal portion, then the decimal portion is dropped. Thus 3.21 truncated is 3, and 5.0 truncated is 5. Values of N, K, and M are application-dependent and may be viewed as, inter alia, user input. Alternatively, values of N, K, and M may be encoded within an algorithm that implements the method of FIG. 6.

The method (or associated algorithm) of FIGS. 6-7 is called the ETCRA method (or ETCRA algorithm). ETCRA stands for Expected Time-Channel from Reference or Alternate Time-Channel.

FIG. 8 presents a table of examples of applicable combinations of N, K, and M which are based on the idea that the condition should be satisfied only if M is a large percentage of N and if K is a small percentage of N. The values in FIG. 8 may be abstracted to the following formulas showing K and M each as a function of N:

$N=2$, $K=0$, and $M=2$;

$3 \leq N \leq 6$, $K=0$, and $M=N-1$;

$7 \leq N \leq 9$, $K=1$, and $M=N-2$; and $N \geq 10$, $K=0.10N$ truncated, and $M=0.90N$ truncated.

The combinations of N, K, and M shown in FIG. 8 are merely illustrative and any combination of N, K, and M satisfying the defining conditions on N, K, and M (i.e., $N \geq 2$, $0 \leq K \leq N$, $2 \leq M \leq N$, and $M > 0.50N$ truncated) are within the scope of the present invention. Additionally, although it may be desirable for the N weeks to be consecutive and to immediately precede the reference week, it is within the scope of the present invention for the N weeks to not be consecutive and/or to not immediately precede the reference week.

Figure 9:
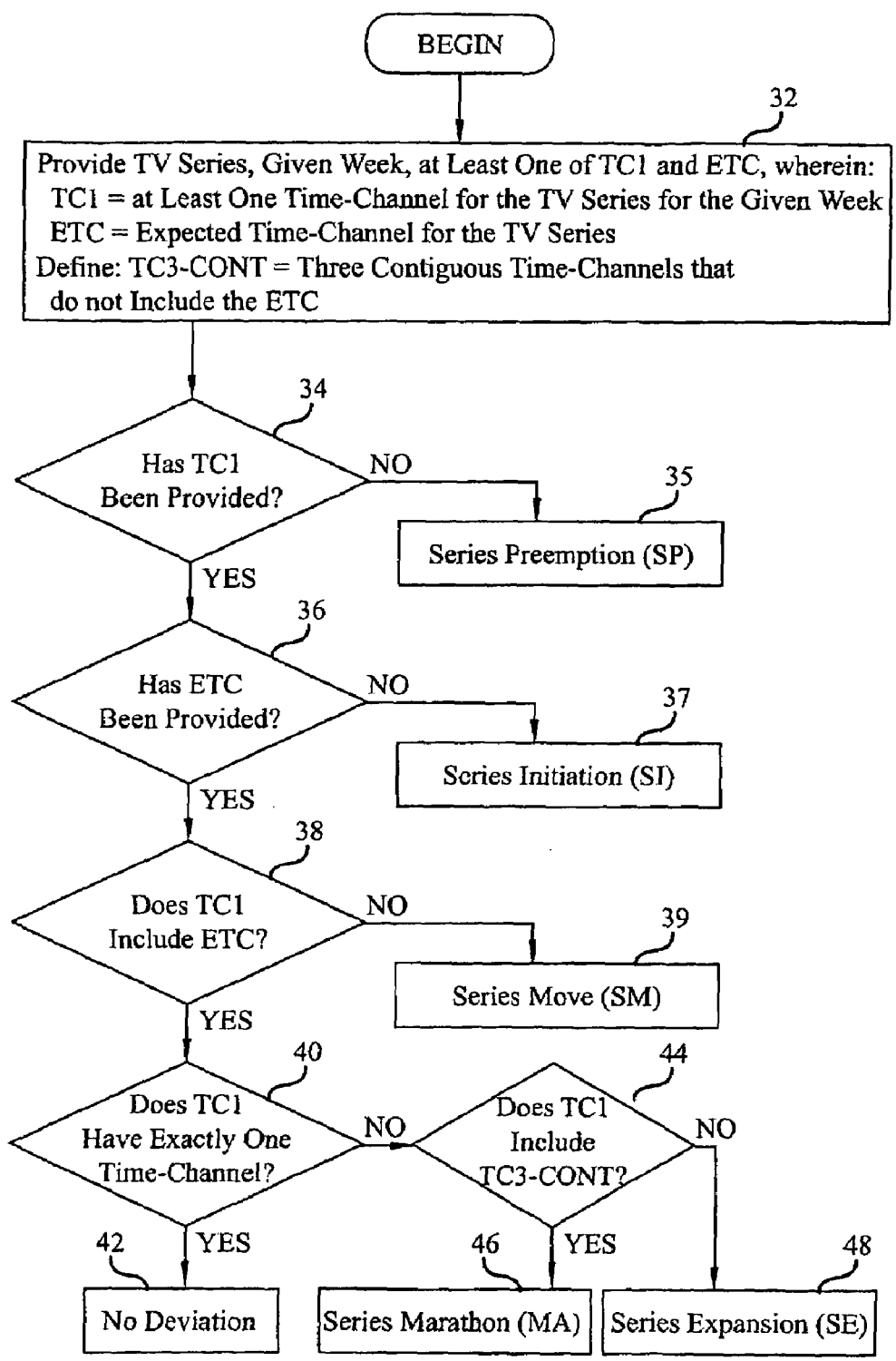
FIG. 9 is a flow chart describing a method or algorithm of Deviation Determination for Television (DDTV), in accordance with embodiments of the present invention.

FIG. 9 is a flow chart describing a method or algorithm for Deviation Determination for Television (DDTV), in accordance with embodiments of the present invention. For a TV series in a given week, deviation determination determines whether a deviation has occurred for the TV series, and the type of deviation that has occurred. Determining the type of deviation that has occurred is called classifying the deviation. Deviations are relative to an expected time-channel unless the deviation is a Series Initiation. The following discussion, although expressed in terms of the method of FIG. 9, applies likewise to an algorithm that implement the method of FIG. 9.

The method of FIG. 9 begins with step 32, which provides a TV series, a given week, and at least one of: TC1 (at least one time-channel for the TV series for the given week) and ECT (an expected time-channel for the series). Providing a TV series means providing identification of the TV series, and providing a given week mean identifying the given week. The ECT may obtained from any source such as, inter alia, a SSE Database Structure. The ECT may be generated in accordance with the method or algorithm of FIGS. 6-7.

Decision step 34 acts based on whether TC1 has been provided. If TC1 has not been provided, then the method determines that a deviation has occurred and that said deviation is a Series Preemption 35.

Decision step 36 is entered from step 34 if TC1 has been provided. Decision step 36 acts based on whether ETC has been provided. If ETC has not been provided, then the method determines that a deviation has occurred and that said deviation is a Series Initiation 37.

Decision step 38 is entered from step 36 if ETC has been provided. Decision step 38 acts based on whether TC1 includes ETC. If TC1 does not include ETC, then the method determines that a deviation has occurred and that said deviation is a Series Move 39.

Decision step 40 is entered from step 38 if TC1 includes ETC. Decision step 40 acts based on whether TC1 has exactly one time-channel. If TC1 has exactly one time-channel, then a deviation has not occurred (i.e., no deviation 42). If TC1 has more than one time-channel, then a deviation has occurred and decision block 44 is entered.

Decision step 44 acts based on whether TC1 comprises three contiguous time-channels that do not include the ETC. If TC1 comprises three contiguous time-channels that do not include the ETC, then the method determines that a deviation has occurred and that said deviation is a Series Marathon 46. But if TC1 does not comprise three contiguous time-channels that do not include the ETC, then the method determines that a deviation has occurred and that said deviation is a Series Expansion 48.

If a deviation is determined to have occurred as determined by the method of FIG. 9, then the deviation may be stored by the DDTV algorithm in a Deviation Database Structure, such as the Deviation Database Structure described supra in conjunction with FIG. 3 or FIG. 5. Additionally, the DDTV algorithm may generate a deviation report which displays some or all of the deviations that are stored in the Deviation Database Structure. Deviation report format include: column format, grid format, and text format.

FIG. 10 illustrates a deviation report in column format, in accordance with embodiments of the present invention. The deviation report in column format comprises a header row (i.e., top row that describes each column) and at least one data row of deviation data. Each such row comprises deviation data relating to a program of a TV series for a given day of a given week, wherein the program is on a time-channel that deviates from an expected time-channel for the TV series. Each data row includes: an identifier of the program (e.g., "Gilmore Girls"), a time-channel at which the program is on (e.g., Thursday, 9:00 pm, channel WPIX), and the expected time-channel (e.g., Thursday, 8:00 pm, channel WPIX). In FIG. 10, "Current Week Day" denotes the given day, and "Current Week Time" denotes the given time. Also in FIG. 10, "Expected Week Day" denotes the expected day, and "Expected Week Time" denotes the expected time. It is within the scope of the present invention for the "Expected Week Day" and "Expected Week Time" columns to be optionally omitted. If the expected time-channels correspond to a prior week, then "Expected" could be changed to a more accurate descriptor such as, inter alia, "Last" or "Prior." Thus in FIG. 10, the programs "Gilmore Girls" and "Who wants to be a Millionaire" represent deviations for the given day of the given week. While the information in the deviation report is organized in FIG. 10 in a particular manner, any organization into a column format of the same or equivalent information is within the scope of the present invention.

FIG. 11 illustrates a deviation report in grid format, in accordance with embodiments of the present invention. The deviation report in grid format comprises a header row (i.e., top row that lists channel and airing times) and at least one data row of deviation data on a given day of a given week. Each data row is keyed to a TV channel. Each data row shows a program of a TV series (or a plurality of programs of TV series) on a time-channel that deviates from an expected time-channel for the TV series. Each data row includes: an identifier of the program (e.g., "Gilmore Girls"), and the time and channel at which the program is on (e.g., Thursday, 9:00 pm, channel WPIX), wherein the times are positioned as defined in the header row. Thus in FIG. 11, the programs "Gilmore Girls" and "Who wants to be a Millionaire" represent deviations for the given day of the given week. While the information in the deviation report is organized in FIG. 10 in a particular manner, any organization into a grid format of the same or equivalent information is within the scope of the present invention.

FIG. 12 illustrates a deviation report in text format, in accordance with embodiments of the present invention. The deviation report in text format comprises lines of text. Each such line of text describes a deviation relating to a program of a TV series for a given day of a given week, wherein the program is on a time-channel that deviates from an expected time-channel for the TV series. Each line of text is organized in accordance with a template that describes the deviation.

The template associated with FIG. 12 is:
"On"<Current Day of Week>","<Series Title>" "<Deviation>" "<Time-of-Day>" on "<Channel>"."

The template variables (e.g.,<Channel>) have values which are user defined, hard coded, etc. With the preceding template, the template variable values utilized in FIG. 12 for <Deviation> are deviation dependent; i.e., Series Preemption="will not be seen on "<Expected Day of Week>
Series Move="has moved to"
Series Expansion="will have an extra episode at"
Series Marathon="will have multiple episodes starting at"
Series Initiation"="will be seen for the first time"

Template variables could be dropped as in "On Friday, The X-files will not be seen." in FIG. 12. The template or template form could vary with each line of text. Additionally, the template or template form could be generally variable and could be generated by software in accordance with an executing algorithm. As an example, the algorithm could generate a template form that is deviation dependent, program genre dependent, dependent on the outcome of a subsidiary calculation, synthesizable based on user selection from a menu of template options, etc. Thus, the template may be predetermined (such as by, inter alia, user input or being encoding within an algorithm), dynamically determined in accordance with an executing algorithm, derived from user input, etc. The preceding template is merely illustrative, and any template that describes a deviation is within the scope of the present invention.

Figure 13:
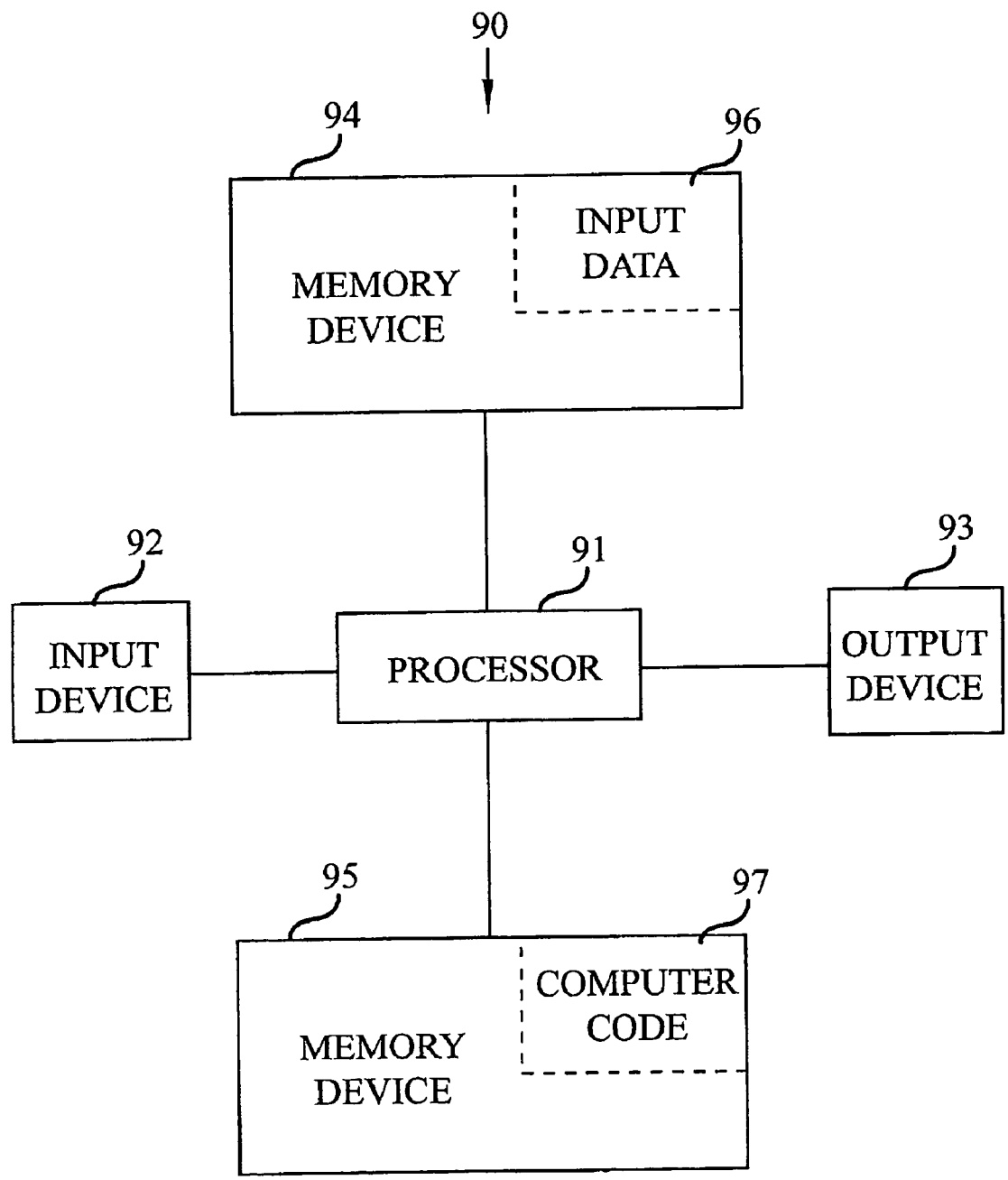
FIG. 13 illustrates a computer system, in accordance with embodiments of the present invention.

FIG. 13 illustrates a computer system 90, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a dynamic random access memory (DRAM), a read-only memory (ROM), etc.

The memory device 95 includes a computer code 97. The computer code 97 includes at least one of the ETCRA algorithm of FIGS. 6-7 and the DDTV algorithm of FIG. 9. The processor 91 is configured to execute the computer code 97 (and the at least one of the ETCRA and DDTV algorithms). The memory device 94 includes input data 96. The input data 96 includes input required by the computer code 97. The output device 93 displays output from the computer code 97. For example, the output device 93 may include an Airings Database Structure, a SSE Database Structure, a Deviation Database Structure, etc. As another example, a deviation report may be directed to the output device 93.

While FIG. 13 shows the computer system 90 as a particular configuration of hardware and software, any configuration of hardware and software, as would be known to a person of ordinary skill in the art, may be utilized for the purposes stated supra in conjunction with the particular computer system 90 of FIG. 13. For example, the memory devices 94 and 95 may be portions of a single memory device rather than separate memory devices.

The present invention includes the various database structures discussed supra (e.g., the SSE Database Structure, the Deviation Database Structure, etc.). Such database structures comprise databases in any form or any data structures having database functionality that is relevant to the present invention. Such database structures comprise, inter alia, relational databases, non-relational databases, spreadsheets, data structures within computer codes, data files formatted as tables, etc.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented Expected Time-Channel from Reference or Alternate Time-Channel (ETCRA) method of determining and storing an expected time-channel for a television (TV) series relative to a reference week, said method comprising:
   identifying in the reference week a reference time-channel on which the TV series is scheduled to be aired or has actually aired;
   specifying at least one condition;
   determining whether the at least one condition has been satisfied;
   if the determining has determined that the at least one condition has not been satisfied, then making the expected time-channel equal to the reference time-channel, else making the expected time-channel equal to an alternate time-channel, the alternate time-channel differing from the reference time-channel and the at least one condition comprising the TV series has aired on the reference time-channel no more than K weeks of N weeks preceding the reference week, wherein N is an integer of at least 2, and wherein K is an integer that is no less than 0 and the TV series has aired on the alternate time-channel during M weeks of the N weeks, wherein M is an integer of at least 2 and greater than 0.50N truncated; and
   notifying a user of the expected time-channel for the television series relative to the reference week.

2. The computer-implemented method of claim 1, wherein the alternate time-channel is an overriding time-channel for the TV series relative to the reference week, and wherein the at least one condition comprises specifying the overriding time-channel.

3. The computer-implemented method of claim 1, wherein the determining includes utilizing program time-channel data relating to programs of the TV series, wherein the program time-channel data is stored in an Airings Database Structure.

4. The computer-implemented method of claim 1, further comprising storing an identification of the expected time-channel in a Series Scheduling Expectation (SSE) database Structure.

5. The computer-implemented method of claim 1, wherein the N weeks are consecutive.

6. The computer-implemented method of claim 5, wherein the N weeks immediately precede the reference week.

7. The computer-implemented method of claim 1, wherein the at least one condition further comprises:
- the TV series has not aired, and is not scheduled to be aired, on the reference time-channel during the first week that is closest in time to the reference week.

8. The computer-implemented method of claim 1, wherein N=2, K=0, and M=2.

9. The computer-implemented method of claim 1, wherein $3 \leq N \leq 6$, K=0, and M=N−1.

10. The computer-implemented method of claim 1, wherein $7 \leq N \leq 9$, K1, and M=N−2.

* * * * *